US 8,171,287 B2

(12) United States Patent
Villela

(10) Patent No.: US 8,171,287 B2
(45) Date of Patent: May 1, 2012

(54) ACCESS CONTROL SYSTEM FOR INFORMATION SERVICES BASED ON A HARDWARE AND SOFTWARE SIGNATURE OF A REQUESTING DEVICE

(75) Inventor: Agostinho de Arruda Villela, Rio de Janeiro (BR)

(73) Assignee: DNABOLT, Inc, Atlanta, GA (US)

( * ) Notice: Subject to any disclaimer, the term of this patent is extended or adjusted under 35 U.S.C. 154(b) by 260 days.

(21) Appl. No.: 10/598,719

(22) PCT Filed: Mar. 10, 2005

(86) PCT No.: PCT/BR2005/000030
§ 371 (c)(1),
(2), (4) Date: Sep. 8, 2006

(87) PCT Pub. No.: WO2005/084100
PCT Pub. Date: Sep. 15, 2005

(65) Prior Publication Data
US 2007/0192608 A1    Aug. 16, 2007

(30) Foreign Application Priority Data

Mar. 10, 2004    (BR) ............................... PI0400265-2

(51) Int. Cl.
*H04L 9/32* (2006.01)
(52) U.S. Cl. ..................... 713/168; 726/1; 726/2; 726/3; 726/4; 726/5; 726/11; 726/12; 726/13; 726/14; 726/17; 726/27; 726/28; 726/29; 713/169; 713/170; 713/182; 713/191; 710/5; 710/10; 710/11; 710/14; 705/51; 705/57; 705/59

(58) Field of Classification Search ....................... 726/5
See application file for complete search history.

(56) References Cited

U.S. PATENT DOCUMENTS

| 5,552,776 | A  | * | 9/1996  | Wade et al. ................... 340/5.74 |
| 6,148,401 | A  | * | 11/2000 | Devanbu et al. ............... 713/170 |
| 6,330,588 | B1 | * | 12/2001 | Freeman ......................... 709/202 |
| 6,477,645 | B1 | * | 11/2002 | Drews ............................ 713/168 |
| 7,117,528 | B1 | * | 10/2006 | Hyman et al. ..................... 726/5 |
| 2001/0044896 | A1 | * | 11/2001 | Schwartz et al. .............. 713/169 |
| 2002/0083339 | A1 | * | 6/2002  | Blumenau et al. ............. 713/201 |
| 2002/0184385 | A1 | * | 12/2002 | Kato .............................. 709/237 |
| 2003/0055931 | A1 | * | 3/2003  | Cravo De Almeida et al. .............................. 709/223 |
| 2003/0084306 | A1 | * | 5/2003  | Abburi et al. ................. 713/188 |
| 2003/0208569 | A1 | * | 11/2003 | O'Brien et al. ............... 709/221 |

(Continued)

FOREIGN PATENT DOCUMENTS

IE          IE02/0429       11/2002

(Continued)

*Primary Examiner* — Nathan Flynn
*Assistant Examiner* — Bryan Wright
(74) *Attorney, Agent, or Firm* — Baker Donelson; Dorian B. Kennedy

(57) ABSTRACT

A system and method for the authorization of access to a service by a computational device or devices. A software agent generates a digital signature for the device each time it attempts to access the service and send it to an authentication server, which compares the digital signature sent with one or more digital signatures on file to determine whether access to the service is permitted. The digital signature is generated by using hashes based on software and hardware configuration data collected from the device. The system may be used in conjunction with other authorization methods and devices.

13 Claims, 3 Drawing Sheets

U.S. PATENT DOCUMENTS

| | | | |
|---|---|---|---|
| 2004/0003266 A1* | 1/2004 | Moshir et al. | 713/191 |
| 2004/0039921 A1* | 2/2004 | Chuang | 713/187 |
| 2005/0076096 A1* | 4/2005 | Nishibe et al. | 709/218 |
| 2005/0133582 A1* | 6/2005 | Bajikar | 235/10 |
| 2005/0149730 A1* | 7/2005 | Aissi et al. | 713/168 |
| 2005/0166053 A1* | 7/2005 | Cui et al. | 713/176 |
| 2006/0200856 A1* | 9/2006 | Salowey et al. | 726/5 |

FOREIGN PATENT DOCUMENTS

| | | | |
|---|---|---|---|
| WO | WO 2004023275 A2 * | 3/2004 | |

* cited by examiner

ACCESS CONTROL SYSTEM FOR INFORMATION SERVICES BASED ON A HARDWARE AND SOFTWARE SIGNATURE OF A REQUESTING DEVICE

FIELD OF THE INVENTION

The present invention is related to the identification and authorization for service access for computational devices or devices with computational resources (a "Device"). In particular, the present invention is applicable to sensitive and confidential information access, such as bank account information access by means of the Internet, secure access to web pages for commercial transactions (e-commerce), corporate Intranet access to confidential information, etc.

BACKGROUND OF THE INVENTION

The prior art describes several security related devices and configurations applicable to access and operation through the Internet. Security needs have to be constantly revised in face of the increasing sophistication of resources used to bypass security systems and fraud electronic access to Internet banking and e-commerce. In countries such as the United States of America, the high efforts and investments made to thwart criminal actions performed by hackers precisely illustrate the importance of guaranteeing user-friendly secure online transactions. Many online and Internet operations use sophisticated security procedures which are based on high levels of complexity in an attempt to guarantee the security in accessing online services which involve private or confidential information. However, this increased complexity results in difficulties posed to legitimate users in accessing such services. This, in its turn, results in a lower-than-optimum level of adherence, by users, to existing forms of online services.

Other apparently more rigorous security schemes, such as those offered on online banking websites are examples of what was explained above. Those services behave as if only the user could visualize and/or access the service. Authentication processes based solely on the user (i.e. user/password) are susceptible to password tracking. The univocal correspondence between a user and his password eases fraud, either by password cloning or by cloning accessed webpages.

As an example of the technique, the Irish invention no. 83221 refers to a means of uniquely identifying computers and systems. The invention, on the other hand, is able to create signatures that identify a device using only logical information and, jointly with the univocal framework and related processes that constitute it, it proposes a security system able to complement or substitute traditional authentication procedures. Although signatures or the idea of using extended positivation scheme for computational devices have existed for a long time, the invention's uniqueness relies on its process, i.e., its client/server architecture conceived to complement or substitute usual authentication systems.

Therefore, what is claimed in document no. 83221 involves the creation of an unique signature for a device (where a device stands for a processor or a processor set composing a network) based on response time statistical distribution and other measurements for physical identification of the devices, used for purposes that may or may not be applicable for conventional authentication schemes. The identification process proposed in this document also uses some logical techniques, however, unlike the invention, these techniques are used as a complement. The logical techniques proposed in the document 83221 do suffice for the creation of a unique identification for a device. Although it is possible to create or compliment an authentication procedure from the process described in document 83221, that is not its intention, and, moreover, its contents do not consider, directly, the creation of a similar process.

This is also what happens with Microsoft's publication titled: PRODUCT ACTIVATION FOR WINDOWS XP-TECHNICAL MARKET BULLETIN. This publication describes validation methods of Windows XP computer program that aim to avoid illegal copies (piracy) or even fraudulent product purchase. The configurations proposed for these methods also have a univocal characteristic, of some complexity for the ordinary user, who would be inhibited to practice fraudulent actions.

SUMMARY OF THE INVENTION

The present invention is a technology used to substantially improve the security involved in an authentication process to access an Internet page, an Intranet page, or any other type of computer server or computer-based service that requires secure authentication. Any of these services will be cited hereinafter as a "SERVICE". The authentication process includes a process coupled to the hardware and software configuration profile of a device, resulting in a unique signature. This signature will be referenced from now on as "SIGNATURE".

Whenever a user tries to access a SERVICE that is using the invention for authentication, the SIGNATURE resulting from the configuration of the device from where the user is attempting to use the SERVICE is verified and compared to a list of authorized device SIGNATURES. If the current device's SIGNATURE matches one of the previously registered SIGNATURES, the user is allowed to access the SERVICE. If not, the user will either be directed to extended positivation or will be denied access to the SERVICE, depending on the previously chosen security options. In case the user is submitted to extended positivation, if his identification is successful, access to the SERVICE will be granted and the user will be given the option to include the present device in the list of authorized SIGNATURES for his account. If the identification is not successful, the user will not be allowed to access the SERVICE.

The invention can be used as a complementary authentication process to another existing authentication process (i.e an authentication method based on user/password pair) as to improve its security level. This may be used, typically, to access less sensitive applications, such logging onto a web portal or ISP.

It is important to stress that the invention is capable of performing this identification without need for any other hardware or software components, such as smart cards, identification cards, etc. Therefore, the invention allows the recognition of a device SIGNATURE simply from its usual hardware and software components.

This document will offer a more in-depth description of possible applications of the invention, however, any application of same described herein is offered as an example, and should not be construed as a limitation to the scope of the claims.

DETAILED DESCRIPTION OF EXEMPLARY EMBODIMENTS

System Architecture

Figure 1:
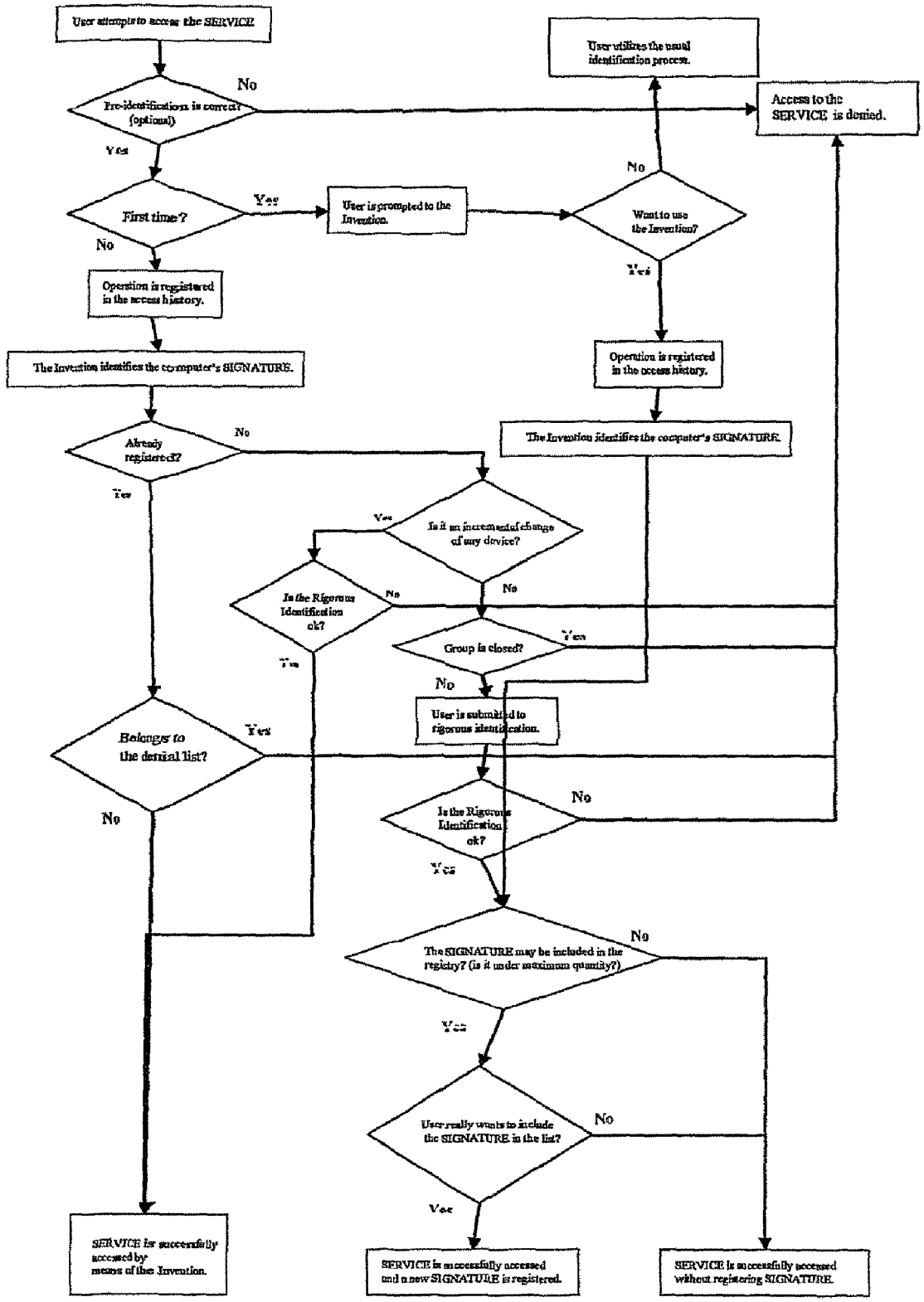
FIG. 1 is a diagram that illustrates the basic operation of one exemplary embodiment of the present invention.
Figure 2:
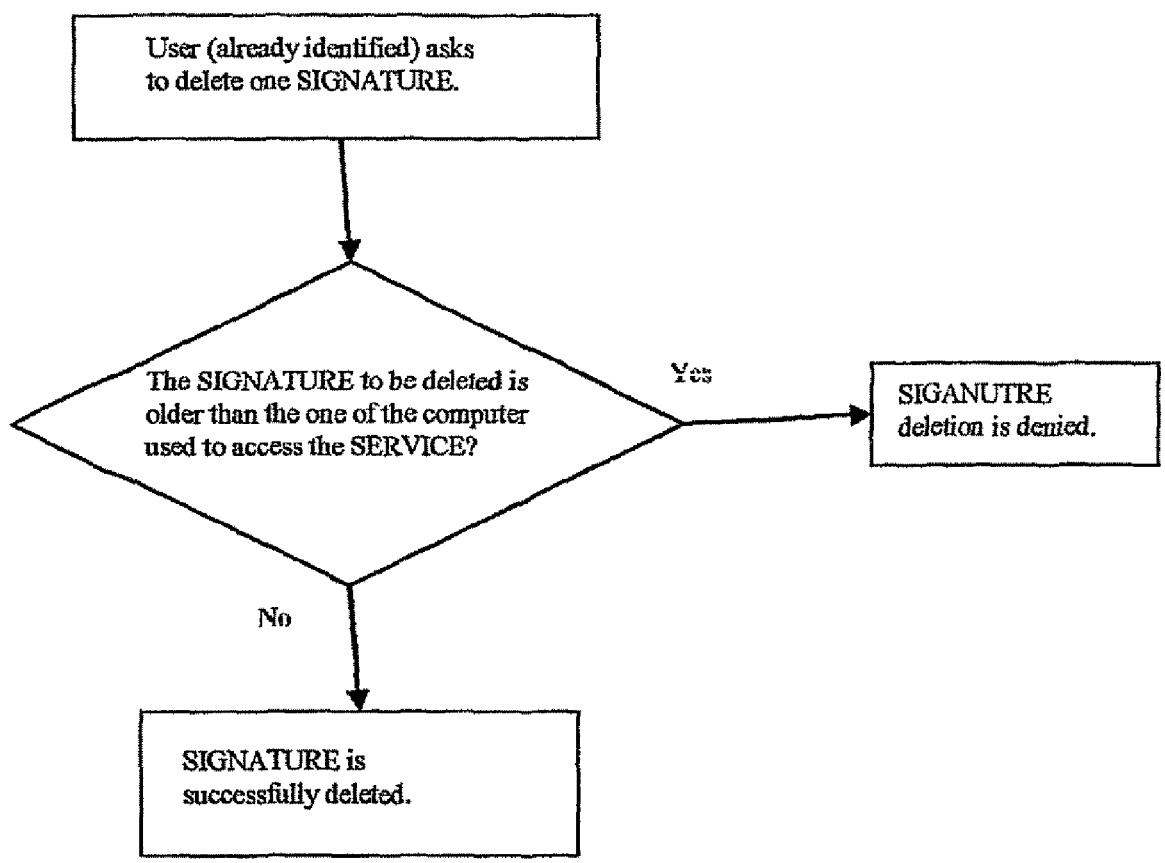
FIG. 2 is a diagram that shows the process of SIGNATURE deletion.
Figure 3:
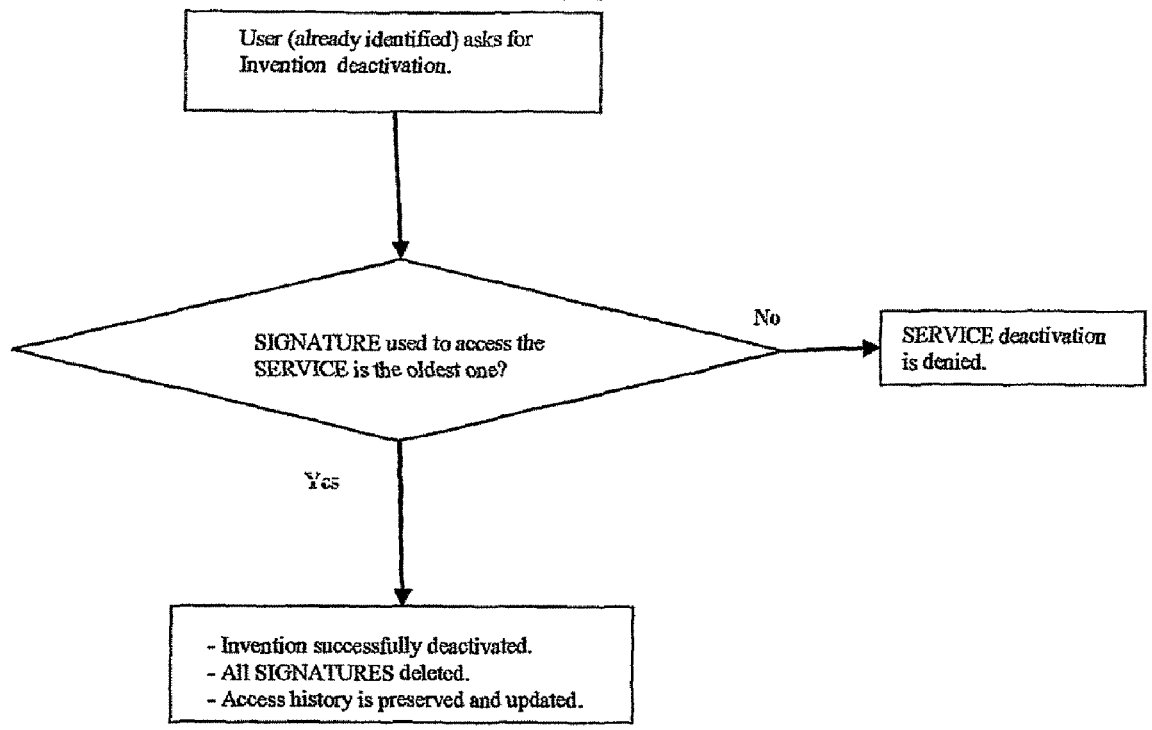
FIG. 3 is a diagram that represents the deactivation of the invention's security system triggered by a user.

The present invention was conceived to operate in a distributed computational environment that can be implemented by means of the Internet or in an internal computational network. It is composed of three basic components:
 a) A Software Agent;
 b) An Authentication Server; and
 c) A network-available SERVICE which requires authentication.

The Software Agent is a program that can discover hardware and software asset information from a Device. It is a key component to obtain the data that will compose the Device's SIGNATURE. The Software Agent needs to be installed or downloaded and installed (preferably by using web distribution techniques that are able to download and execute a program in a single step, such as, ActiveX or a browser plug-in), by means of the Internet or an internal network, in order to start the SIGNATURE identification process.

The Authentication Server is a server that receives a SIGNATURE from a Software Agent, compares it to a set of authorized SIGNATURES and authorizes or not access to a SERVICE. The Authentication Server needs to be connected by means of an internal network or the Internet to the device submitted to SIGNATURE recognition, in order to allow the identification process to work properly. It is, therefore, an online authentication system.

The Authentication Server has both an interactive and a storage function. It interacts with the Software Agent and the SERVICE providing access authentication. Besides, it works as a repository of the registered SIGNATURES as much as storing the access attempt history (successful or not) of each SERVICE user.

The SERVICE is an Internet page, Intranet page or other type of computational server or computational service that requires secure authentication. The invention complements other authentication methods or security procedures already utilized by the SERVICE, as a pre-identification. For example, it may be used to deny the use of the SERVICE from a device whose SIGNATURE is not registered and recognized, even though another preidentification process could be successfully accomplished by means of other coexistent authentication processes (for instance, deny access even if user/password pair are correct).

Operation

The operation and method of the present invention is illustrated by the steps described below:

1) A user tries to access a SERVICE submitted to the invention's authentication. As the invention can coexist with other authentication processes, the user may be submitted to other authentication or complementary security procedures, as a pre-identification, whenever necessary. Typical pre-identification processes are: username/password pair, verifying authorized IP address ranges, answering specific questions, systems that protect against "software robots", etc.

2) If the user has not registered any device SIGNATURE before the invention yet, the user will be led to a web page or software window that explains how the invention works and tells that the user will be submitted to a registering process immediately afterwards.
 a) This step can be implemented in such a way to be optional, in case the SERVICE provider wants to offer the user the option of accessing the SERVICE using the invention or not. In this case, the user may also take the initiative of deactivating or reactivating the invention usage when desired. In order to reactivate the invention usage, the user must identify themselves in some way (by means of username/password pair, answering questions, etc). It is recommended to allow the invention's deactivation only from the device that has the oldest SIGNATURE registered in the account, since this SIGNATURE is generally considered to be the most trustable one.

3) Once the user agrees to use the invention, he or she must allow the SOFTWARE AGENT download and execution on his device, unless this has already occurred. This step must be repeated for each device that needs to be submitted to the invention's authentication process.

4) Once the SOFTWARE AGENT is installed on the user's device, the invention will identify its SIGNATURE and submit it for registration with the SERVICE. Typically, the first registration does not require rigorous authentication.

The SIGNATURE is made from data sampled from the device's hardware and software components. The SIGNATURE will identify the device without the need of any supplementary identification device, such as a smart card.

The device's identification is done by detecting and identifying essential hardware and software components of the device. The invention allows that some of these components undergo incremental changes without modifying the device's SIGNATURE. However, if the device has undergone deep modifications, its SIGNATURE will be changed. This means that the device will be considered as a new device and will not be recognized by the SERVICES accessed before then. In this case, the user has to register the new device SIGNATURE. It is also important to clarify that changes of components that are not considered to be essential may be done without affecting the SIGNATURE.

The SIGNATURE is composed of a group of information hashes extracted from hardware and software components. These hashes cannot be reversed to recompose the information used to make the SIGNATURE, preserving, this way, user privacy and security. It is recommendable that, at each transaction, the hashes be grouped in a different way and submitted to several levels of cryptography. This procedure protects the system even more against anyone who attempts to intercept the communication between the user device and the Authentication Server and tries, by simply reproducing the transmitted data, to pretend to be the original device.

5) If the user tries to access the SERVICE from a device that was not previously registered (provided that there was at least one device previously registered), the invention will allow the access only after applying an extended positivation (i.e. specific questions besides the username/password pair). If the answers are correct, the user will be allowed to access the SERVICE, with the option to register (or not) the present device's SIGNATURE, according to the configuration previously chosen. If the identification fails, the user will not be allowed to access the SERVICE.
 a) Optionally, in case the user has already reached a determined quantity of SIGNATURES associated to his account (defined in accordance with the implementation needs), he can choose whether the number of SIGNATURES should be limited to this quantity or not. Alternatively, it is possible to limit the SIGNATURE set in a way to create a closed group of devices that can access the SERVICE by means of a given account. These options can be implemented in a mandatory way, that is, the user will be able to register SIGNATURES coupled to his account until a maximum number or only to devices that belong to a specific group.

b) Even in the case that is not allowed to register additional SIGNATURES, it is possible, even so to, optionally, access the SERVICE from a non-registered device by means of extended positivation. Anyway, the SIGNATURE of this device CANNOT be added to the existent SIGNATURE set. In this case, the SERVICE access from this device is performed strictly as a "detached" and temporary operation.

c) Optionally, it is also possible to specify a maximum number of times a SIGNATURE can be present in SIGNATURE lists of different SERVICE users. This maximum number can even be zero. In this situation, the common device will be considered to be a "malicious" one and will be included in a denial list for devices that are not authorized to authenticate before the invention.

6) Whenever necessary, the user may delete the SIGNATURES registered in his account. It is recommended that the SIGNATURE deletion process be always done from a device considered to be more secure and trustable, which is, typically, a device registered in the account before the one to be deleted. This way, the user can only delete a given SIGNATURE if it is using a device whose SIGNATURE had been registered BEFORE the SIGNATURE being deleted. It is also recommendable that the oldest SIGNATURE can be deleted only from the device it was originally created.

7) Once the user keeps accessing the page regularly by means of the invention, it will be able to provide past information about all access or access attempts performed upon the user account. This historical information will remain stored even if the user decides to deactivate, even though temporarily, the usage of the system of the present invention.

What is claimed is:

1. A method for identifying devices and controlling access to a service, comprising the steps of:
    collecting data related to software and hardware configurations from a device through a software agent installed on the device;
    generating a digital signature for the device by hashing the software and hardware configuration data, wherein the resulting hashes are used to generate the digital signature are changed with every attempt to access a service;
    sending the digital signature of the device to an authentication server, wherein the authentication server compares the digital signature sent with one or more previously-stored digital signatures; and
    determines whether the device has been excluded from accessing or enrolling in the service through the authentication server by determining whether the device is on a list or in a group of devices not allowed to access the service, or is included within a group of devices allowed to access the service.

2. The method of claim 1, wherein the digital signature sent to the authentication server is encrypted.

3. The method of claim 1, wherein the hashes used to generate the digital signature are changed with every attempt to access a service, wherein the hashes cannot be reversed.

4. The method of claim 1, wherein authenticating the digital signature is at least one of multiple is one of several stages of a framework of authorization and authentication processes governing access to the service by the device.

5. The method of claim 1, wherein the authentication server allows a maximum number of enrollments for a particular device.

6. The method of claim 1, wherein the authentication server allows minor modifications to the software or hardware configurations of a previously-enrolled device so as to preserve access or denial of access for the device.

7. The method of claim 6, wherein the previously-stored digital signature of the device is updated to reflect the modifications.

8. The method of claim 1, wherein the authentication server logs all accesses or attempted accesses by a device to the service.

9. The method of claim 1, wherein multiple devices can be registered for a single user with the authentication server to create a registration hierarchy.

10. The method of claim 9, wherein a user can unregister a device only through the device itself, or another device within the registration hierarchy registered earlier than the device to be unregistered.

11. A method for identifying devices and controlling access to a service, comprising the steps of:
    collecting data related to software and hardware configurations from the device through a software agent installed on the device;
    generating a digital signature for the device by hashing the software and hardware configuration data, wherein the resulting hashes used to generate the digital signature are changed with every attempt to access the service;
    sending the digital signature of the device to the authentication server;
    verifying with the authentication server through a comparison of the digital signature sent with one or more previously-stored digital signature to determine that the device is not on a list or in a group of devices not allowed to access the service, or is not a device with a maximum number of enrollments set to zero; and registering the device as authorized to access the service.

12. The method of claim 11, further comprising the step of verifying the identity of the device each time it subsequently attempts to access the service.

13. A system for identifying devices and controlling access to a service, comprising:
    a software agent installed on a device, adapted to collect data related to software and hardware configuration of the device;
    a digital signature for the device, generated by the software agent by hashing the software and hardware configuration data which is changed with every attempt to access the service; and
    an authentication server that determines whether the device can access the service based upon the digital signature of the device being compared with one or more previously-stored digital signatures;
    wherein the authentication server verifies that the device is not a list or in a group of devices not allowed to access the service, or is included within a group of devices allowed to access the service, or is not a device with a maximum number of enrollments set to zero.

* * * * *